(12) United States Patent
Sim et al.

(10) Patent No.: US 8,830,163 B2
(45) Date of Patent: Sep. 9, 2014

(54) INTEGRATED KEYBOARD AND TOUCHPAD

(75) Inventors: Chen Chen Sim, Singapore (SG); Ban Ho Chong, Singapore (SG); Ki Su Lenny Lim, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1221 days.

(21) Appl. No.: 12/334,125

(22) Filed: Dec. 12, 2008

(65) Prior Publication Data

US 2010/0149104 A1 Jun. 17, 2010

(51) Int. Cl.
*G09G 5/00* (2006.01)
*G06F 3/02* (2006.01)
*G06F 1/16* (2006.01)
*G06F 3/048* (2013.01)
*G06F 3/041* (2006.01)
*G06F 3/0488* (2013.01)

(52) U.S. Cl.
CPC .......... *G06F 1/1692* (2013.01); *G06F 3/04886* (2013.01); *G06F 1/1616* (2013.01)
USPC ............ 345/156; 345/169; 345/1.3; 345/173; 715/773

(58) Field of Classification Search
CPC ... G06F 3/041; G06F 3/0412; G06F 3/04886; G06F 3/0489; G06F 3/04897; G06F 2203/04103; H04N 21/42204; H04N 5/4403; G01C 21/3664
USPC .................................................. 345/173–178
See application file for complete search history.

(56) References Cited

U.S. PATENT DOCUMENTS

| 4,990,900 | A  | * | 2/1991  | Kikuchi ........................ 345/174 |
| 5,907,375 | A  | * | 5/1999  | Nishikawa et al. ............. 349/12 |
| 6,861,961 | B2 | * | 3/2005  | Sandbach et al. ............... 341/22 |
| 6,982,432 | B2 | * | 1/2006  | Umemoto et al. .............. 257/12 |
| 2006/0034042 | A1 | * | 2/2006  | Hisano et al. ................. 361/681 |
| 2007/0257821 | A1 | * | 11/2007 | Son et al. ......................... 341/22 |
| 2008/0018631 | A1 | * | 1/2008  | Hioki et al. .................... 345/206 |

* cited by examiner

*Primary Examiner* — Sumati Lefkowitz
*Assistant Examiner* — David Tung

(57) ABSTRACT

A data input system including a screen that selectably displays an image of a data input device such as a keyboard or a computer mouse. The screen tracks pressure applied by the user, and processes an input signal created by the pressure into input data according to the image displayed on the screen.

21 Claims, 5 Drawing Sheets

INTEGRATED KEYBOARD AND TOUCHPAD

BACKGROUND

Laptop computers typically feature a fixed keyboard area and a touchpad area that tracks the movement of a user's fingers and serves as a replacement for a mouse normally used with a desktop computer. The touchpad and keyboard areas share space on a portion of the laptop. Because the keyboard and touchpad must be present, they serve to limit how small a laptop can be. As these components are reduced in size, however, their effectiveness is reduced; the keyboard becomes more difficult on which to type and the touchpad is able to track only a smaller range of motion. Because the keyboard and touchpad must each occupy a certain minimum physical space (to accommodate a user's fingers), the laptop computer must be at least a certain physical size.

In addition, the location of the touchpad on a typical laptop computer forces the user to remove his fingers from the keyboard in order to use the touchpad. The arrangement of the touchpad and buttons prevents the use of the buttons while the user uses the touchpad; the user must remove his fingers from the touchpad in order to click the buttons.

BRIEF DESCRIPTION OF THE DRAWINGS

Exemplary embodiments of the invention described herein are shown in the attached drawings. It is understood, however, that the invention is not limited to the precise arrangements and constructions particularly shown. In the drawings.

DETAILED DESCRIPTION OF THE EMBODIMENTS

Embodiments of the data input system feature a user interface area that selectively provides a keyboard or a touchpad interface. The system includes a layer of film on which an image of a user interface (e.g., a keyboard or a mouse) may be displayed. The system also includes at least one layer that transmits signals to a processing unit. The interface further includes a layer that provides tactile feedback to the user.

Figure 1:
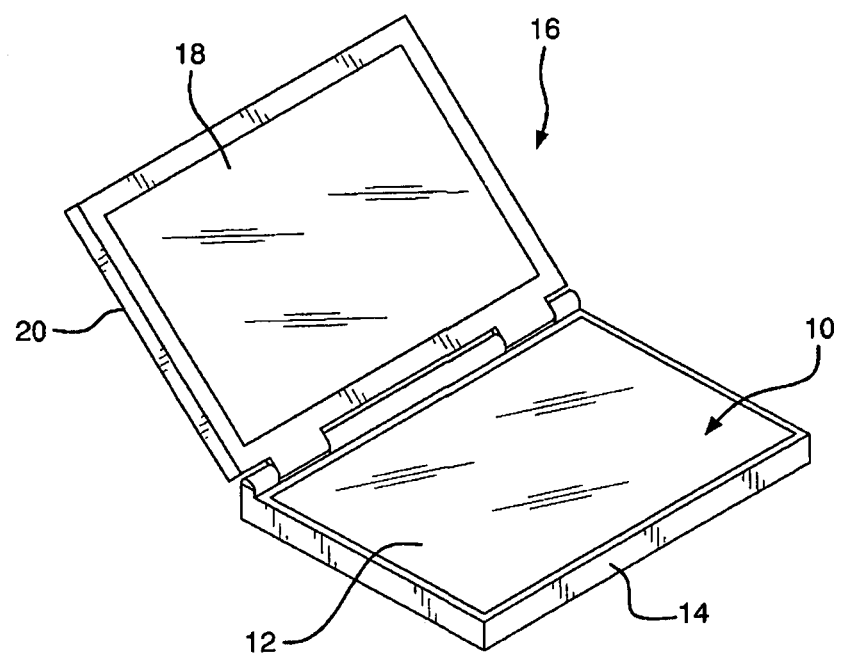
FIG. 1 shows an isometric view of a laptop computer including an embodiment of a data input system.
Figure 2A:
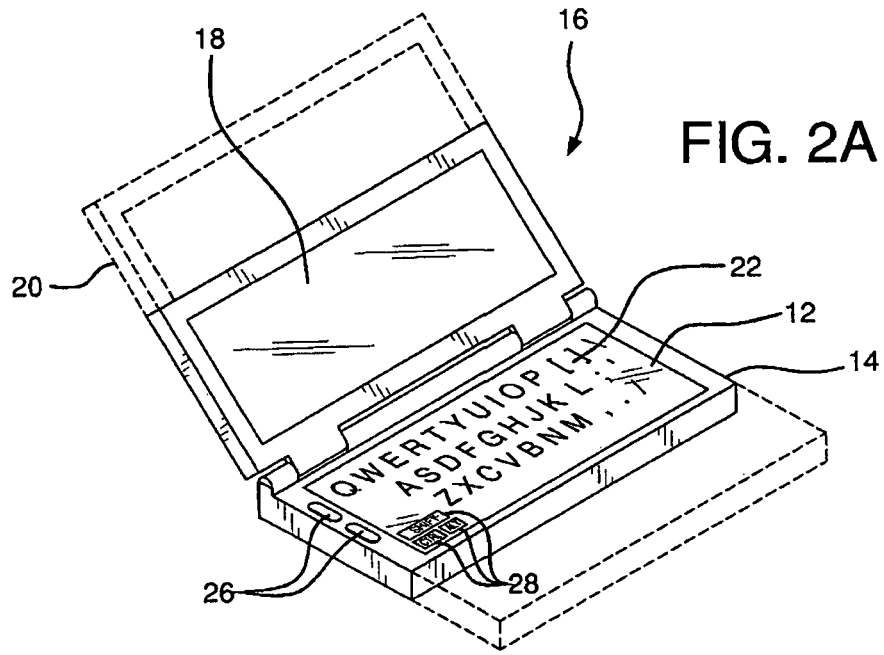
FIG. 2A is an isometric view of a laptop computer incorporating an embodiment of, the data input system, wherein an image of a keyboard is visible.

FIG. 1 shows an embodiment of an input device. The input device 10 includes a screen 12 located on the input side 14 of the laptop computer 16, which can include a display screen 18 located on an output side 20. As shown in FIG. 2A, the screen 12 displays the image of a desired data entry device; in this embodiment, an image of a keyboard 22 is displayed, by which a user may enter character data into the computer. FIG. 2A also shows an example of how a laptop computer using the data input system described herein may be made smaller than a laptop computer using a conventional input system.

Figure 2B:
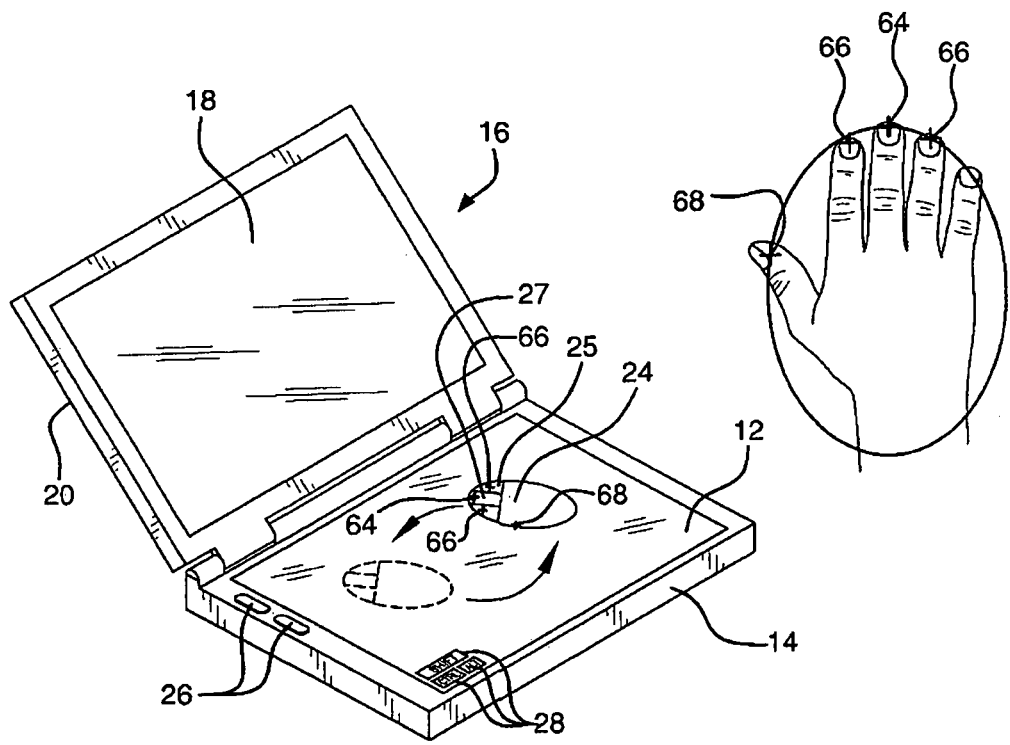
FIG. 2B is an isometric view of a laptop computer incorporating an embodiment of the data input system, showing an image of a mouse and of the hand of a user.

As seen in FIG. 2B, the screen 12 may also function as a touchpad and may display the image of a conventional computer mouse 24, which tracks the movements of a user's hand or other appendage, just as a conventional mouse does. The input side 14 also includes at least one mode button 26, which switches the input screen 12 between display modes; for example, "keyboard" and "mouse" modes. In "keyboard" mode, the keyboard image 22 is displayed. In "mouse" mode, the mouse image 24 is displayed. The input side also includes commonly-used buttons 28, which are buttons that are commonly used in conjunction with either a keyboard or a mouse, and can include the "Control," "Shift," and "Alt" buttons. As shown in FIGS. 2A and 2B, the buttons 28 can be displayed on the input screen 12 in both "keyboard" and "mouse" modes. Alternatively, the buttons 28 may be physically placed on the chassis of input side 14. The mouse image 24 follows the movements of a user's hand, and allows the user to click the virtual "buttons" on the mouse as if the user were controlling a conventional mouse.

Figure 3:
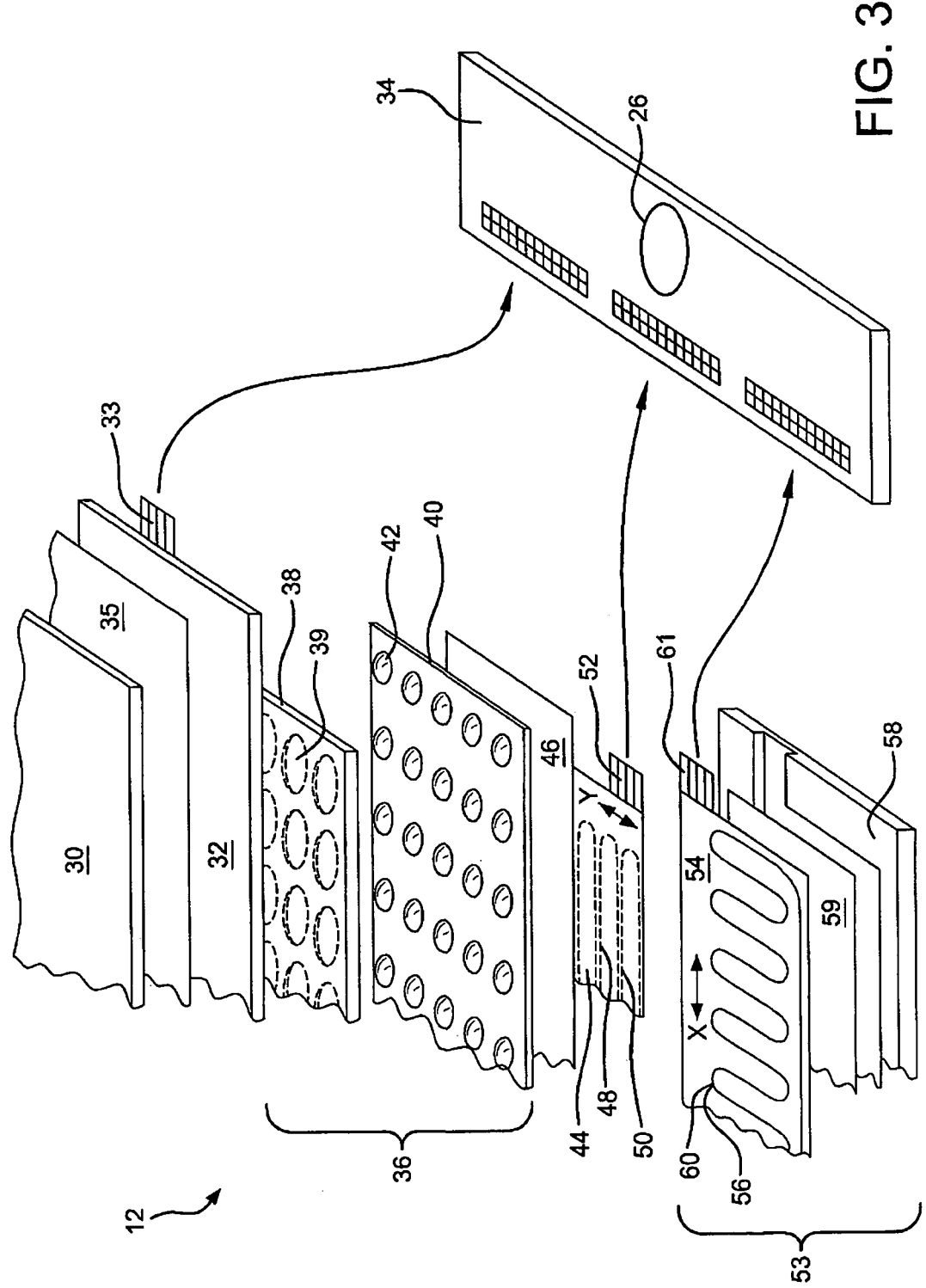
FIG. 3 is an exploded partial side view of a cross-section of an embodiment of the data input system.
Figure 4A:
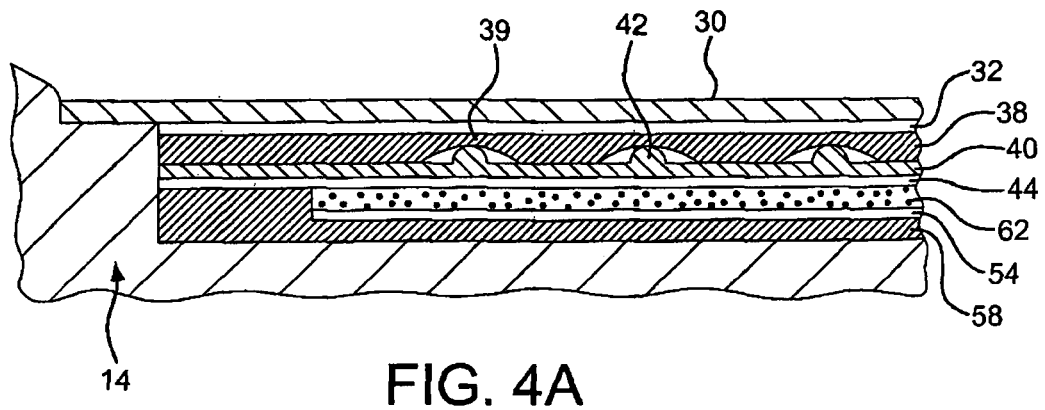
FIG. 4A is a side view of a cross-section of an embodiment of the data input system.

The input screen 12 is touch-sensitive, and responds to pressure applied by a user to provide data inputs to the computer. The pressure may be applied by an appendage of the user—typically, the user's hand or fingers—or by an item manipulated by the user, such as a stylus. The input screen in this embodiment includes more than one layer. As shown in FIGS. 3 and 4A, the top first layer 30 of the screen includes a transparent film, such as a thermoplastic elastomer (TPE) film that cushions the user interface and provides a flexible, tactile feedback to the user. The first layer 30 is approximately 1-2 millimeters thick, but it can have any suitable thickness. The display second layer 32 includes a flexible display on which the image of a conventional data input device may be displayed. The image in this embodiment is displayed in color, and may show any data input device desired. Accordingly, such data input devices are not limited to a conventional "QWERTY"-style keyboard or a conventional mouse. The display layer 32 may be formed of any suitable flexible display technology, such as electronic paper or a flexible liquid crystal display (LCD) that transmits the force applied by the user. The display layer 32 includes a connection tail 33 through which data may be transmitted to or from a circuit board 34 of the computer 16. The display layer 32 can be affixed to the top layer 30 by an optically clear adhesive 35.

Figure 4B:
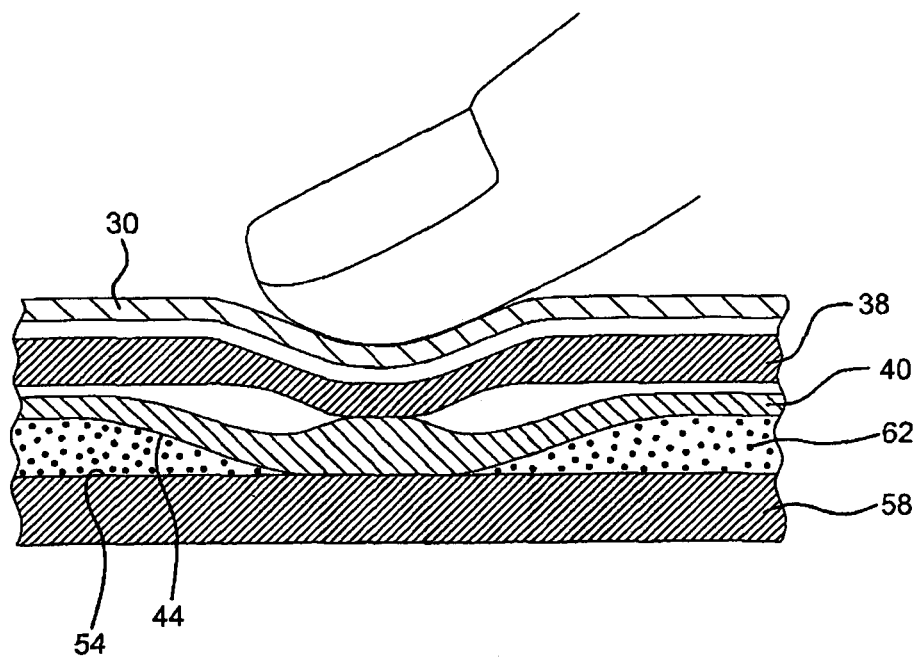
FIG. 4B is a side view of a cross-section of an embodiment of the data input system, showing a user entering a keystroke.

The third layer 36 includes an upper tactile layer 38 and a lower tactile layer 40. The upper tactile layer 38 can be made from a flexible, non-conductive material such as TPE or silicone, and has a thickness of approximately 1-2 millimeters, although it can have any suitable thickness. It also may feature multiple flex areas 39 in its lower surface; in these areas, the thickness of the layer 38 is reduced. The lower tactile layer 40 is made from a suitable material such as TPE or silicone, and is about 1-2 millimeters thick, although it can have any suitable thickness. The layer 40 also features multiple nipples 42 on its upper surface. Each flex area 39 is aligned with a nipple 42, and each is located so that when the input screen 12 is in "keyboard" mode, the location of an image of a character key aligns with a flex area/nipple pair, as shown in FIG. 4B. When a user presses a character key location, the flex area will flex, simulating the depression of a key on a conventional keyboard, and the nipple will transfer the localized pressure through the third layer 36.

The fourth layer 44 includes, for example, a film, such as polyethylene terephthalate (PET), bonded on its top surface to the layer 40 via adhesive 46, which may be optically clear. The fourth layer 44 includes a first indium tin oxide (ITO) pattern 48 on its bottom surface. The film is flexible and can be optically clear or opaque. The ITO pattern forms a circuit 50 arranged to determine the position in a first linear direction Y of pressure applied by a user. The ITO circuit 50 is electrically connected to a computer circuit board 34 by a connection tail 52. The circuit board 34 may be the same board to which connection tail 33 is connected, or it may be a separate board.

The fifth layer 53 includes a film 54, which may be made from PET, within a second ITO pattern 56 on its top surface, bonded to a substrate 58 via optically clear adhesive 59. The substrate 54 may be rigid to provide a solid base for the screen 12, and can be constructed of a polycarbonate film, such as Lexan, and, in this embodiment, is mounted in input side 14 of the laptop computer 16. The second ITO pattern 56 forms a circuit 60 that is arranged to determine the position in a second linear direction X of the pressure applied by the user, and which is electrically connected to circuit board 34 by connection tail 61. As shown in FIG. 3, the substrate 58 may be contoured to allow one or more of the layers to fit flush within the substrate.

Located between the fourth and fifth layers is an insulating layer 62, shown in FIGS. 4A and 4B. This layer includes a liquid or a gel that is not electrically conductive. Any nonconductive liquid or gel, such as silicone gel, may be used. The layer 62 normally prevents electric current from passing between first and second ITO circuits 50 and 60, respectively.

As shown in FIG. 4B, when a user presses on the screen 12, the first through fourth layers flex at the point of pressure, and transmit the localized pressure to the fourth layer 44, forcing a corresponding point on the first ITO circuit 50 through the insulating layer 62 and into contact with the second ITO circuit 60. This contact completes a switch between the ITO circuits, and generates a signal that indicates the position of the pressure generated by the user.

Based on the data supplied by the ITO circuits 50 and 60 indicating the Y- and X-positions, respectively, of the pressure applied by the user, software installed in the computer calculates the location of the pressure point. When the input system is in "keyboard" mode, the computer can then match the calculated location with the character key known to be displayed at that location. The software may also be programmed to disregard pressure signals located at points other than those associated with character keys or other predetermined areas.

When the input system is in "mouse" mode, the system will allow the user to calibrate the mouse image. As used in this description, "mouse image" may be an image of a computer mouse, or it may be any image or group of images that is movable on the screen. As shown in FIG. 2B, the system will display a reference point 64 and can display at least one of input points 66 and 68. In this embodiment, the user will place his middle finger on the reference point 64, his index and ring fingers on button points 66, and his thumb on scroll point 68. The pressure at these locations will force ITO circuits 50 and 60 into contact, generating data signals. The user will then move the points 66 and 68 to locations in which the user's hand position is comfortable; the reference point 64 remains fixed at this time.

Figure 2C:
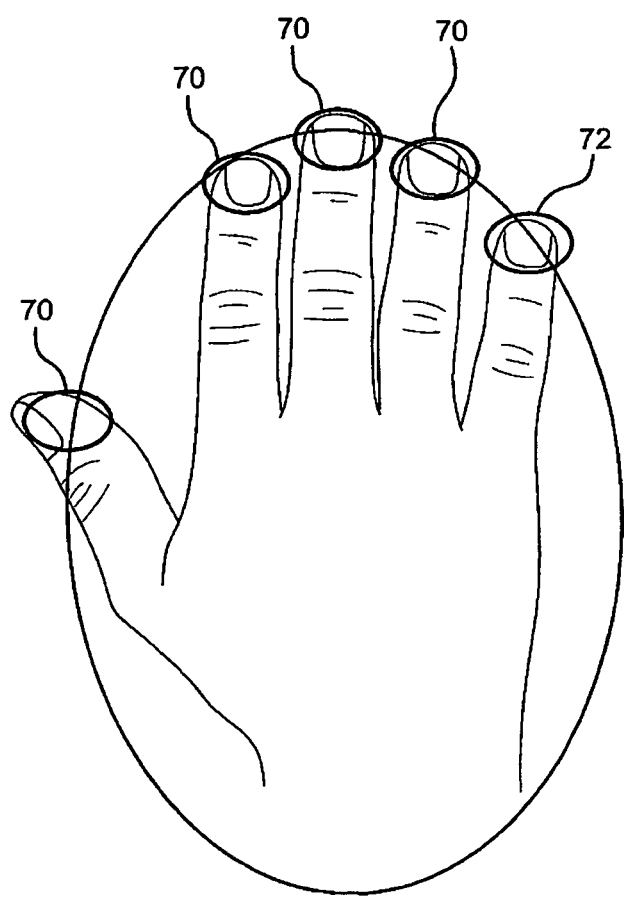
FIG. 2C is a view of a hand of the user, showing the areas from which the data input system accepts signals

After the user has calibrated the mouse image, the system will retain the locations of points 66 and 68 relative to reference point 64; that is, as the user moves his fingers around the screen, the points 66 and 68 will move with, and remain fixed relative to, the reference point 64. In the present embodiment, a cursor on the output screen 18 will mimic the movement of the reference point 64. Also in the present embodiment, the user need only maintain pressure on the screen at the reference point. As shown in FIGS. 2B and 2C, the locations of the points 64 and 66 indicate the respective centers of the sensing areas 70, which each define discrete areas of the screen 12, and which are each associated with specific input data. In this embodiment, the points 66 indicate the centers of the sensing areas 70 associated with mouse button data (e.g., left- and right-click), and the location of scroll point 68 indicates the center of a sensing area 70 that is associated with scrolling. When the user applies pressure within any of the sensing areas 70, the system interprets the pressure as a data signal, and will input the data associated with the location of the pressure. If the user applies pressure to a point 72 of the screen outside a sensing area 70, the system will ignore the input or consider the data to be null. If the user removes pressure from the reference point, the mouse image may be positioned by the user at any location on the screen, or it may reset to a default location. The sensing areas 70 are also used in "keyboard" mode of this embodiment. In "keyboard" mode, however, the sensing areas are fixed on the screen, and define areas corresponding to keys in the keyboard image.

As shown in FIG. 1, because the keyboard and touchpad functions share the same space in this embodiment of the invention, the physical space required by the data input side of the laptop can be reduced. This not only allows the laptop to utilize fewer moving parts, but it also increases the available space for and intuitiveness of the touchpad function, which until now has been relatively small and awkward to use when compared to a conventional external mouse arrangement. In the current embodiment, the mouse "buttons" move with the cursor location, more closely mimicking the experience of using a computer mouse than does a conventional laptop computer touchpad with fixed physical buttons. The use of an input screen also provides better sealing against moisture and foreign matter, as the input system may be hermetically sealed It will be apparent to those skilled in the art that various modifications and variations can be made in the configuration of the present invention without departing from the spirit or scope of the invention. It is intended that the present invention cover such modifications and variations provided they come within the scope of the appended claims or their equivalents.

What is claimed is:

1. A data input system comprising:
 a screen that selectably displays an image of a data input device, the screen being responsive to pressure applied by a user; and
 a processor that processes an input signal created by the pressure into input data according to the image of the data input device on the screen,
 wherein the data input device comprises a keyboard and wherein the screen comprises a plurality of spaced distinct tactile areas, each tactile area comprising a first portion of a first circuit, a second portion of a second circuit and an electrically insulating gel between the first portion and the second portion,
 wherein the image of the keyboard is displayed such that individual keys of the image of the keyboard align with and correspond to individual tactile areas of the plurality of spaced distinct tactile areas and wherein depressment of an individual tactile area moves the first portion into contact with the second portion through the electrically insulating gel while parting the electrically insulating gel;
 wherein the screen comprises:
 a flexible display layer;
 a flexible tactile layer beneath the display layer, wherein the flexible tactile layer comprises;
 an upper layer having a thickness, and including a plurality of dielectric concave areas, each of the plurality of concave areas corresponding to one of the plurality of spaced distinct tactile areas;
wherein the flexible display layer is above the first circuit and the second circuit.

2. The data input system as in claim 1, where the image of the data input device represents a computer mouse, wherein the image of the computer mouse is movable over the plurality of spaced distinct tactile areas.

3. The data input system of claim 1, wherein the screen is included in a computer.

4. The data input system of claim 1, wherein the flexible tactile layer further comprises:
a lower layer including a plurality of dielectric nipples, each of the plurality of nipples received within one of the plurality of concave areas;
wherein each of the plurality of concave areas directly overlies and is vertically aligned with one of the plurality of nipples so as to transfer a localized pressure applied to the upper layer to the lower layer.

5. A data input system comprising:
a screen that is responsive to a pressure applied by a user to a screen surface of the screen, and operates to selectably display an image of a data input device, such that the screen is operable in a first mode in which the pressure is interpreted as movement along the screen surface, and a second mode in which the pressure is interpreted as point pressure in a direction intersecting the screen surface at a location on the screen surface,
wherein the data input device comprises a keyboard and wherein the screen comprises a plurality of spaced distinct tactile areas, each tactile area comprising a first portion of a first circuit, a second portion of a second circuit and an electrically insulating gel between the first portion and the second portion,
wherein the image of the keyboard is displayed such that individual keys of the image of the keyboard align with and correspond to individual tactile areas of the plurality of spaced distinct tactile areas and wherein depressment of an individual tactile area moves the first portion into contact with the second portion through the electrically insulating gel while parting the electrically insulating gel;
wherein the screen comprises:
a flexible display layer;
a flexible tactile layer beneath the display layer, wherein the flexible tactile layer comprises;
an upper layer having a thickness, and including a plurality of dielectric concave areas, each of the plurality of concave areas corresponding to one of the plurality of spaced distinct tactile areas;
wherein the flexible display layer is above the first circuit and the second circuit.

6. The data input system of claim 5, wherein the system further comprises: a processor, which determines a location of the pressure applied by the user along a first axis of the screen surface, determines the location of the pressure on a second axis of the screen surface, calculates the location where the axes intersect, and positions a predetermined point on an image to align with the calculated location.

7. The data input system of claim 6, wherein the predetermined point is a point on an image of a computer mouse.

8. The data input system of claim 5, wherein the system further comprises: a processor, which determines a location of the pressure applied by the user along a first axis of the screen surface, determines the location of the pressure on a second axis of the screen surface, calculates the location where the axes intersect, and inputs data associated with a predetermined area that aligns with the calculated point.

9. The data input system of claim 8, wherein the predetermined area is represented as an image of either a keyboard key or a mouse button.

10. The data input system of claim 8, wherein data not associated with the predetermined area is null.

11. The data input system of claim 5, wherein the screen operates to selectively display a second image of a second input device comprising a computer mouse, wherein the image of the computer mouse is movable over the plurality of spaced distinct tactile areas.

12. The data input system of claim 5, wherein the screen is included in a computer.

13. The data input system of claim 5, wherein the first mode and the second mode are selectable by the user.

14. A data input system comprising a screen having multiple layers, the layers including:
a flexible display layer;
a flexible tactile layer adapted to provide tactile feedback to the user and disposed beneath the flexible display layer;
a first flexible circuit layer disposed beneath the flexible tactile layer and including a first electronic circuit;
a second flexible circuit layer disposed beneath the first circuit layer and including a second electronic circuit; and
an insulating gel layer disposed between the first and second circuit layers, the insulating gel layer selectably preventing contact between the first and second electronic circuits; and
wherein the first electronic circuit is located on a bottom surface of the first flexible circuit layer, and the second electronic circuit is located on a top surface of the second flexible circuit layer, so that a pressure applied to the flexible display layer creates electrical contact between corresponding locations on the first and second electronic circuits,
wherein the flexible tactile layer includes:
an upper layer having a thickness, and including a plurality of concave areas of reduced thickness;
a lower layer including a plurality of nipples each of the plurality of nipples received within one of the plurality of concave areas;
wherein a concave area of the upper layer aligns with and receives a nipple of the lower layer so as to transfer a localized pressure applied to the upper layer to the lower layer such that depressment of the concave area against the nipple transfers the localized pressure to the first electronic circuit to move a first location of the first electronic circuit through the insulating gel to part the insulating gel and to contact a second location of the second electronic circuit;
wherein the plurality of concave areas of the upper layer are dielectric, wherein the plurality of nipples of the lower layer are dielectric and wherein the first electronic circuit and the second electronic circuit are below the plurality of concave areas and the plurality of nipples.

15. The data input system of claim 14, wherein the system further comprises a substrate disposed beneath the second flexible circuit layer.

16. The data input system of claim 14, wherein the flexible display layer includes a flexible liquid crystal display.

17. A computer comprising:
a display screen;
a data input system operating to accept data inputted by a user, wherein the display screen is responsive to a pressure applied by the user to a screen surface of the display screen, and operates to selectably display an image of a desired data input device, such that the display screen is operable in a first mode in which the pressure is interpreted as movement along the screen surface, and a second mode in which the pressure is interpreted as point pressure in a direction intersecting the screen surface at a location on the screen surface;

and an output screen contained within a second side and adapted to display output data;

wherein the data input system comprises:

a flexible display layer;

a flexible tactile layer adapted to provide tactile feedback to the user and disposed beneath the display layer;

a first flexible circuit layer disposed beneath the flexible tactile layer and including a first electronic circuit;

a second flexible circuit layer disposed beneath the first circuit layer and including a second electronic circuit; and an insulating gel layer disposed between the first and second flexible circuit layers, the insulating gel layer selectable preventing contact between the first and second electronic circuits; and wherein the first electronic circuit is located on a bottom surface of the first flexible circuit layer, and the second flexible electronic circuit is located on a top surface of the second flexible circuit layer, so that a pressure applied to the flexible display layer creates electrical contact between corresponding locations on the first and second electronic circuits; and wherein the tactile layer includes:

an upper layer having a thickness, and including a plurality of concave areas of reduced thickness;

a lower layer including a plurality of nipples;

wherein a concave area of the upper layer aligns with, faces and directly overlies a nipple of the lower layer so as to transfer a localized pressure applied to the upper layer to the lower layer such that depressment of an individual concave area against a corresponding individual nipple transfers the localized pressure to the first electronic circuit to move a first location of the first electronic circuit through the insulating gel to part the insulating gel and to contact a second location of the second electronic circuit.

18. The computer of claim 17, wherein the system further comprises a substrate disposed beneath the second flexible circuit layer.

19. The computer of claim 17, wherein the flexible display layer includes a flexible liquid crystal display.

20. The computer of claim 17, wherein each of the plurality concave areas receives one of the plurality of nipples.

21. The computer of claim 17, wherein the flexible display layer comprises a flat planar surface facing away from the concave area.

* * * * *